(12) United States Patent
Aridor et al.

(10) Patent No.: US 7,809,708 B2
(45) Date of Patent: Oct. 5, 2010

(54) INFORMATION SEARCH USING KNOWLEDGE AGENTS

(75) Inventors: Yariv Aridor, Haifa (IL); David Carmel, Haifa (IL); Michael Herscovici, Haifa (IL); Yoelle Maarek-Smadja, Haifa (IL); Aya Soffer, Haifa (IL); Ronny Lempel, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 11/923,676

(22) Filed: Dec. 10, 2007

(65) Prior Publication Data

US 2008/0147644 A1   Jun. 19, 2008

Related U.S. Application Data

(63) Continuation of application No. 10/634,319, filed on Aug. 1, 2003, now Pat. No. 7,318,057, which is a continuation of application No. 09/610,705, filed on Jul. 6, 2000, now Pat. No. 6,636,848.

(60) Provisional application No. 60/208,226, filed on May 31, 2000.

(51) Int. Cl.
*G06F 17/30* (2006.01)
(52) U.S. Cl. .................. 707/706; 707/723; 707/726; 707/728; 707/748
(58) Field of Classification Search ............... 707/3–7, 707/10, 104.1, 706, 723, 726, 728, 748; 704/7
See application file for complete search history.

(56) References Cited

U.S. PATENT DOCUMENTS

| | | | | |
|---|---|---|---|---|
| 5,598,557 A * | 1/1997 | Doner et al. | ....................... | 1/1 |
| 6,026,388 A * | 2/2000 | Liddy et al. | .................... | 707/1 |
| 6,169,968 B1 * | 1/2001 | Kabuo | ......................... | 703/14 |
| 6,269,368 B1 * | 7/2001 | Diamond | ....................... | 707/6 |
| 6,278,993 B1 * | 8/2001 | Kumar et al. | ............... | 707/708 |
| 6,349,307 B1 * | 2/2002 | Chen | ................................ | 1/1 |
| 6,401,084 B1 * | 6/2002 | Ortega et al. | .................... | 707/2 |
| 6,424,358 B1 * | 7/2002 | DiDomizio et al. | ......... | 715/762 |
| 6,438,539 B1 * | 8/2002 | Korolev et al. | ..................... | 1/1 |
| 6,990,490 B2 * | 1/2006 | Sasaki et al. | ....................... | 1/1 |
| 7,096,423 B2 * | 8/2006 | Murata | ....................... | 715/246 |
| 7,340,459 B2 * | 3/2008 | Krohn et al. | ................ | 707/748 |
| 7,376,648 B2 * | 5/2008 | Johnson | ............................. | 1/1 |
| 7,657,507 B2 * | 2/2010 | Shi et al. | ............................ | 1/1 |
| 2001/0056414 A1 * | 12/2001 | Christal et al. | ................. | 707/1 |
| 2003/0069873 A1 * | 4/2003 | Fox et al. | ....................... | 707/1 |

* cited by examiner

*Primary Examiner*—Don Wong
*Assistant Examiner*—Hanh B Thai

(57) ABSTRACT

A method for searching a corpus of documents, such as the World Wide Web, includes defining a knowledge domain and identifying a set of reference documents in the corpus pertinent to the domain. Upon inputting a query, the corpus is searched using the set of reference documents to find one or more of the documents in the corpus that contain information in the domain relevant to the query. The set of reference documents is updated with the found documents that are most relevant to the domain. The updated set is used in searching the corpus for information in the domain relevant to subsequent queries.

21 Claims, 6 Drawing Sheets

INFORMATION SEARCH USING KNOWLEDGE AGENTS

CROSS-REFERENCE TO RELATED APPLICATIONS

This application is a continuation of U.S. patent application Ser. No. 10/634,319 filed Aug. 1, 2003 now U.S. Pat. No. 7,318,057, which is a continuation of U.S. patent application Ser. No. 09/610,705 filed Jul. 6, 2000 (now U.S. Pat. No. 6,636,848), which claims the benefit of U.S. Provisional Patent Application No. 60/208,226 filed May 31, 2000, which is incorporated herein by reference.

FIELD OF THE INVENTION

The present invention relates generally to methods and systems for computerized searching in large bodies of data, and specifically to efficient and effective search methods for use on the World Wide Web.

BACKGROUND OF THE INVENTION

Finding information on the World Wide Web has become increasingly difficult with the growth of the Web, and frequently resembles a search for a needle in a haystack. General-purpose search engines typically return large quantities of irrelevant information, which the user must sift and refine. In order to search effectively and obtain high-quality search results, users are required to engage in an interactive process, typically including the following steps:

Choose a search engine and submit a query.

Traverse the list of retrieved pages to find the relevant ones.

Apply shallow browsing based on outgoing hyperlinks from the set of retrieved pages.

Provide relevance feedback for "more like this" services.

Refine the query repeatedly and resubmit it (possibly to other search engines).

Since searching the Web for precise information in this manner requires iterative user feedback, users must be connected to the Internet and interacting with the computer throughout an entire search session.

This model of interactive searching does not accord well with pervasive computing devices, which are being used increasingly for Internet access. Such devices include personal digital assistants (PDAs), hand-held computers, smart phones, TV browsers, wearable computers, and other mobile devices. Typically, pervasive devices are used to make only brief network connections while the user is outside the office or home. Furthermore, by their nature, pervasive devices are much less facilitative of user interactivity than are desktop computers. There is therefore a need for more precise, non-interactive, "one-shot" search services, for users of both pervasive devices and desktop computers.

A number of Web sites offer tools that are intended to make searching more efficient. For example, Internet Search Agent (ISA) (www.renegade-software.com/ISA) is a Java Web search tool that queries several popular search engines, automatically downloads the results, and then displays them on the user's browser. ISA can be configured as an unattended download agent that retrieves Web pages for viewing offline, or as an improved search engine that returns entire Web pages, rather than just a title and several lines of text. ISA is non-interactive, but it does not attempt to autonomously improve the precision of the user's search results.

SearchPad (www.searchpad.com) is an intelligent agent for Web search, metasearch and resource classification. It supports basic and advanced Boolean queries. It also allows users to specify a "phrase neighborhood" to search, in terms of words, sentences, and paragraphs. SearchPad offers "accept" and "reject" rules to support screening of results and allows users to give feedback by rating documents that it finds. These user preferences are reused for similar, subsequent searches and for defining search topics. Thus, SearchPad can learn rules and definitions of topics, but it is highly interactive and relies on the user either to build the rules explicitly or to provide relevance feedback by indicating which keywords make a page relevant or irrelevant.

SmartRanker (www.tooto.com/smartranker.html) is a ranking search engine that attempts to anticipate the user's information needs. It sends an intelligent agent to get search results from a number of popular Internet search engines. The results are analyzed, filtered, grouped and re-ranked by a ranking agent using a human-created knowledge base. The SmartRanker Web site does not specify how the knowledge base is built or specifically how the re-ranking is performed.

Karnak (www.karnak.com) is a search service that guides the user through the process of building search queries that are structured to provide precise information. Karnak then searches the Web, adding what it considers to be the best information to a personal library that is created for each user. The library can be accessed from any Internet-capable computer. Karnak checks for dead and stale links before providing results and regularly updates users by e-mail on the status of their research.

Automatic query expansion has been recognized as an efficient tool for improving user search results. It is usually performed by adding terms related to the terms specified by the user, using a thesaurus or synonym table. Xu and Croft describe and compare a number of techniques of query expansion, for example, in "Query Expansion using Local and Global Document Analysis," published in *Proceedings of the 19th Annual International ACM SIGIR Conference on Research and Development in Information Retrieval* (1996), which is incorporated herein by reference. U.S. Pat. Nos. 4,823,306 and 5,987,457, whose disclosures are similarly incorporated herein by reference, also describe methods of query refinement in the context of text searching.

Web crawling can be used as a search technique to find pages having hyperlinks to or from a root site that is known to be relevant to the user's query. These linked pages are often relevant to the query, as well, even when they do not contain the exact search terms used in the query. The CLEVER crawler (www.almaden.ibm.com/cs/k53/clever.html) uses hypertext classification and topic distillation tools to focus its work within a specific topic domain, while ignoring unrelated and irrelevant material. This focused crawler is described by Chakrabarti et al., in "Focused Crawling: A New Approach to Topic-Specific Web Resource Discovery," published in *Proceedings of the Eighth World Wide Web Conference* (Toronto, 1999), and incorporated herein by reference.

Another system that combines Web search and crawling is Fetuccino-Alfredo, described by Ben-Shaul, et al., in "Adding Support for Dynamic and Focused Search with Fetuccino," also published in *Proceedings of the Eighth World Wide Web Conference* (Toronto, 1999), and incorporated herein by reference. In this system, users provide a broad domain in which the search should be performed, in addition to their specific query. Fetuccino-Alfredo first identifies sites related to the broad domain, using a general-purpose search engine, and then dynamically searches for the narrow query by traversing the domain sites and their close neighbors.

A number of techniques have been proposed for topic distillation, so that the most authoritative pages in a collection of linked pages can be identified. One such technique is described by Kleinberg in "Authoritative Sources in a Hyperlinked Environment," published in *Proceedings of the Ninth ACM-SIAM Symposium on Discrete Algorithms* (1998) and incorporated herein by reference. Aspects of this technique are also described in U.S. Pat. No. 5,884,305, whose disclosure is incorporated herein by reference, as well. Kleinberg proposes and tests an algorithmic formulation of the notion of "authority," based on the mutually-reinforcing relationship between a set of relevant, authoritative pages and a set of "hub pages" that join them together in a link structure. The relationship is used to compute hub and authority scores for the nodes in a graph of linked pages, indicating which of the pages are the most authoritative.

Another technique of this sort is described by Lempel and Moran in "The Stochastic Approach for Link-Structure Analysis (SALSA) and the TKC Effect," published in *Proceedings of the Ninth World Wide Web Conference* (Amsterdam, 2000), and incorporated herein by reference. SALSA examines random walks on graphs derived from the link structure of a collection of Web pages. The authors show that their approach uses the same meta-algorithm as does Kleinberg but is more efficient and, in some cases, more effective in identifying the meaningful authorities.

SUMMARY OF THE INVENTION

In preferred embodiments of the present invention, knowledge agents with domain specialization enable users to apply precise, "one-shot" searching on the Web. There is no need for the user to be connected to the Internet or to interact with the search engine during the search process. This capability is especially important for users of pervasive devices, but is also useful to users of desktop computers and workstations. The knowledge agent receives the user's query and carries out the search by simulating the steps involved in the conventional interactive search process. The user can thus disconnect while the agent is searching and can receive the search results the next time he or she connects to the Internet or by e-mail.

Each knowledge agent specializes in a domain by extracting relevant information every time it performs a search. It uses the information to improve the precision of subsequent search efforts. To this end, the knowledge agent automatically maintains a knowledge base, which stores this information persistently. The knowledge base comprises a set of leading sites in its domain and a repository of terms that appear in these sites, including their lexical affinities. The knowledge base is preferably initialized by providing a set of sites relevant to the domain of interest. Then, after each search, the knowledge agent evaluates the search results and, as appropriate, adds to the knowledge base new pages that were found in the search to be highly relevant, possibly taking the place of old pages with lower utility.

In terms of user interaction, the knowledge agent acts as an intermediary between the user and one or more Web search engines, preferably managing the entire search process for the user. For each search, the user chooses the knowledge agent that has the relevant specialization, typically a knowledge agent that the user has initialized and used in previous searches. Alternatively, the knowledge agent may imported from another user or from a repository of agents available to the public. Preferably, the knowledge agent is imported simply by copying the agent's knowledge base. Thereafter, the user may keep and refine the knowledge agent for his or her own particular domain of interest.

Although domain-focused search engines and Web crawlers are known in the art, as described in the Background of the Invention, none of them make use of persistent, acquired knowledge in a domain that is defined and then refined by a user, as do preferred embodiments of the present invention. This unique, focused knowledge base makes it practical for "one-shot" searching without user interaction. Deployment of the knowledge agent as a "front end" to existing search engines, together with the portability of personalized knowledge agents among different computers and different users, makes these embodiments of the present invention easy to use, particularly in the environment of pervasive devices.

In some preferred embodiments of the present invention, when the user submits a search query to the knowledge agent, the agent first refines the query based on its knowledge of the user's domain of interest. Optionally, the user has the opportunity to edit the refined query. It then passes the refined query to a number of search engines, most preferably based on the user's indicated preferences. The knowledge agent analyzes the initial search results and then retrieves additional pages pointing to and from these pages according to their relevance to the query and to the domain of interest. The knowledge agent applies a ranking algorithm to this expanded set of pages. Preferably, the algorithm takes into account textual affinity to the particular query and to the domain of interest, as well as topological information for finding the most "authoritative" pages. The ranked list of pages is returned to the user via e-mail or upon request, typically the next time the user initiates a communication with the agent. In addition, the knowledge agent updates its knowledge of the domain and of the user's interests based on this search, so as to refine the knowledge base for the next search.

Although preferred embodiments are described herein with reference to searching on the World Wide Web, it will be appreciated that the principles of the present invention are also applicable, mutatis mutandis, to searching in other large bodies of linked information.

There is therefore provided, in accordance with a preferred embodiment of the present invention, a method for searching a corpus of documents, including:

defining a knowledge domain;

identifying a set of reference documents in the corpus pertinent to the domain;

inputting a first query;

searching the corpus using the set of reference documents to find one or more of the documents in the corpus that contain information in the domain relevant to the first query; and adding at least one of the found documents to the set of reference documents for use in searching the corpus for information in the domain relevant to a second, subsequent query.

Preferably, inputting the first query includes inputting one or more search terms, wherein searching the corpus includes finding lexical characteristics of terms in the reference documents and refining the search terms using the lexical characteristics. Additionally or alternatively, inputting the first query includes specifying one or more documents representative of the information to be found in the corpus.

Further preferably, searching the corpus includes searching the corpus to find the documents that contain the information relevant to the query and ranking the found documents by comparing them to the set of reference documents. Most preferably, ranking the found documents includes evaluating a textual resemblance between the found documents and the reference documents. Alternatively or additionally, ranking the found documents includes assessing links between the found documents and the reference documents. Further preferably, adding the at least one of the found documents includes adding at least the document having the highest ranking.

Preferably, adding the at least one of the found documents includes removing one of the documents from the set responsive to adding the at least one of the found documents. Most preferably, the method includes tracking a level of relevance of the reference documents to the queries, and removing the one of the documents includes removing one of the reference documents whose tracked level of relevance is low.

In a preferred embodiment, the corpus includes at least a part of the World Wide Web, and the documents include Web pages, and searching the corpus includes conveying the query to one or more Web search engines. Typically, inputting the first query includes receiving the query from a user of a pervasive device, and searching the corpus includes searching while the device is disconnected from the Web.

Preferably, identifying the set of reference documents includes opening one or more files of a knowledge base on a computer in which data regarding the reference documents are saved. In a preferred embodiment, identifying the set of reference documents includes identifying the set of documents used by a first user in searching the corpus, and opening the one or more files includes copying the files for use by a second user in searching the corpus for information in the domain.

There is additionally provided, in accordance with a preferred embodiment of the present invention, a method for searching a corpus of documents containing terms, including:

defining a knowledge domain;

identifying a set of reference documents in the corpus pertinent to the domain;

finding lexical characteristics of the terms in the reference documents;

inputting a search query;

refining the search query using the lexical characteristics; and searching the corpus to find information in the domain responsive to the refined query.

Preferably, finding the lexical characteristics includes finding lexical affinities among the terms, wherein the search query includes search terms, and wherein refining the search query includes adding to the search terms further terms found to have lexical affinity to the search terms.

There is also provided, in accordance with a preferred embodiment of the present invention, a method for searching a corpus of linked documents containing terms, including:

defining a knowledge domain;

identifying a set of reference documents in the corpus pertinent to the domain;

inputting a search query;

searching the corpus to find one or more of the documents in the corpus that contain information relevant to the query;

evaluating a textual resemblance between the found documents and the reference documents so as to assign respective textual scores to the found documents;

assessing links between the found documents and the reference documents so as to assign respective topological scores to the found documents; and ranking the found documents with respect to their relevance to the domain responsive to the textual scores and the topological scores.

Preferably, evaluating the textual resemblance includes assessing, for each of a plurality of the terms in the found documents, a respective frequency of occurrence in the reference documents.

In a preferred embodiment, the documents include World Wide Web pages, and assessing the links includes generating a graph of the links between the pages and calculating authority weights of the nodes of the graph.

There is further provided, in accordance with a preferred embodiment of the present invention, apparatus for searching a corpus of documents, including:

a memory, adapted to store an identification of a set of reference documents in the corpus pertinent to a predefined knowledge domain; and a search processor, which responsive to receiving a first query as input, is adapted to search the corpus using the set of reference documents to find one or more of the documents in the corpus that contain information in the domain relevant to the first query, and to add at least one of the found documents to the set of reference documents stored in the memory for use in searching the corpus for information in the domain relevant to a second, subsequent query.

There is moreover provided, in accordance with a preferred embodiment of the present invention, apparatus for searching a corpus of documents containing terms, including:

a memory, adapted to store an identification of a set of reference documents in the corpus pertinent to a predefined knowledge domain; and a search processor, which is adapted to find lexical characteristics of the terms in the reference documents, and responsive to receiving a query as input, is adapted to refine the search query using the lexical characteristics and to search the corpus to find information in the domain responsive to the refined query.

There is furthermore provided, in accordance with a preferred embodiment of the present invention, apparatus for searching a corpus of linked documents containing terms, including:

a memory, adapted to store an identification of a set of reference documents in the corpus pertinent to a predefined knowledge domain; and a search processor, which responsive to receiving a query as input, is adapted to search the corpus to find one or more of the documents in the corpus that contain information relevant to the query, to evaluate a textual resemblance between the found documents and the reference documents so as to assign respective textual scores to the found documents, to assess links between the found documents and the reference documents so as to assign respective topological scores to the found documents, and to rank the found documents with respect to their relevance to the domain responsive to the textual scores and the topological scores.

There is additionally provided, in accordance with a preferred embodiment of the present invention, a computer software product for searching a corpus of documents, the product including a computer-readable medium in which program instructions are stored, which instructions, when read by a computer, cause the computer to receive a definition of a knowledge domain and an identification of a set of reference documents in the corpus pertinent to the domain, and further cause the computer, responsive to a first query, to search the corpus using the set of reference documents to find one or more of the documents in the corpus that contain information in the domain relevant to the first query, and to add at least one of the found documents to the set of reference documents for use in searching the corpus for information in the domain relevant to a second, subsequent query.

There is also provided, in accordance with a preferred embodiment of the present invention, a computer software product for searching a corpus of documents, the product including a computer-readable medium in which program instructions are stored, which instructions, when read by a computer, cause the computer to receive a definition of a knowledge domain and an identification of a set of reference documents in the corpus pertinent to the domain and to find lexical characteristics of the terms in the reference documents, and further cause the computer, responsive to a query, to refine the search query using the lexical characteristics and to search the corpus to find information in the domain responsive to the refined query.

There is further provided, in accordance with a preferred embodiment of the present invention, a computer software product for searching a corpus of documents, the product including a computer-readable medium in which program instructions are stored, which instructions, when read by a computer, cause the computer to receive a definition of a knowledge domain and an identification of a set of reference documents in the corpus pertinent to the domain, and further cause the computer, responsive to a query, to search the corpus to find one or more of the documents in the corpus that contain information relevant to the query, to evaluate a textual resemblance between the found documents and the reference documents to assign respective textual scores to the found documents, to assess links between the found documents and the reference documents to assign respective topological scores to the found documents, and to rank the found documents with respect to their relevance to the domain responsive to the textual scores and the topological scores.

The present invention will be more fully understood from the following detailed description of the preferred embodiments thereof, taken together with the drawings in which:

DETAILED DESCRIPTION OF PREFERRED EMBODIMENTS

Figure 1:
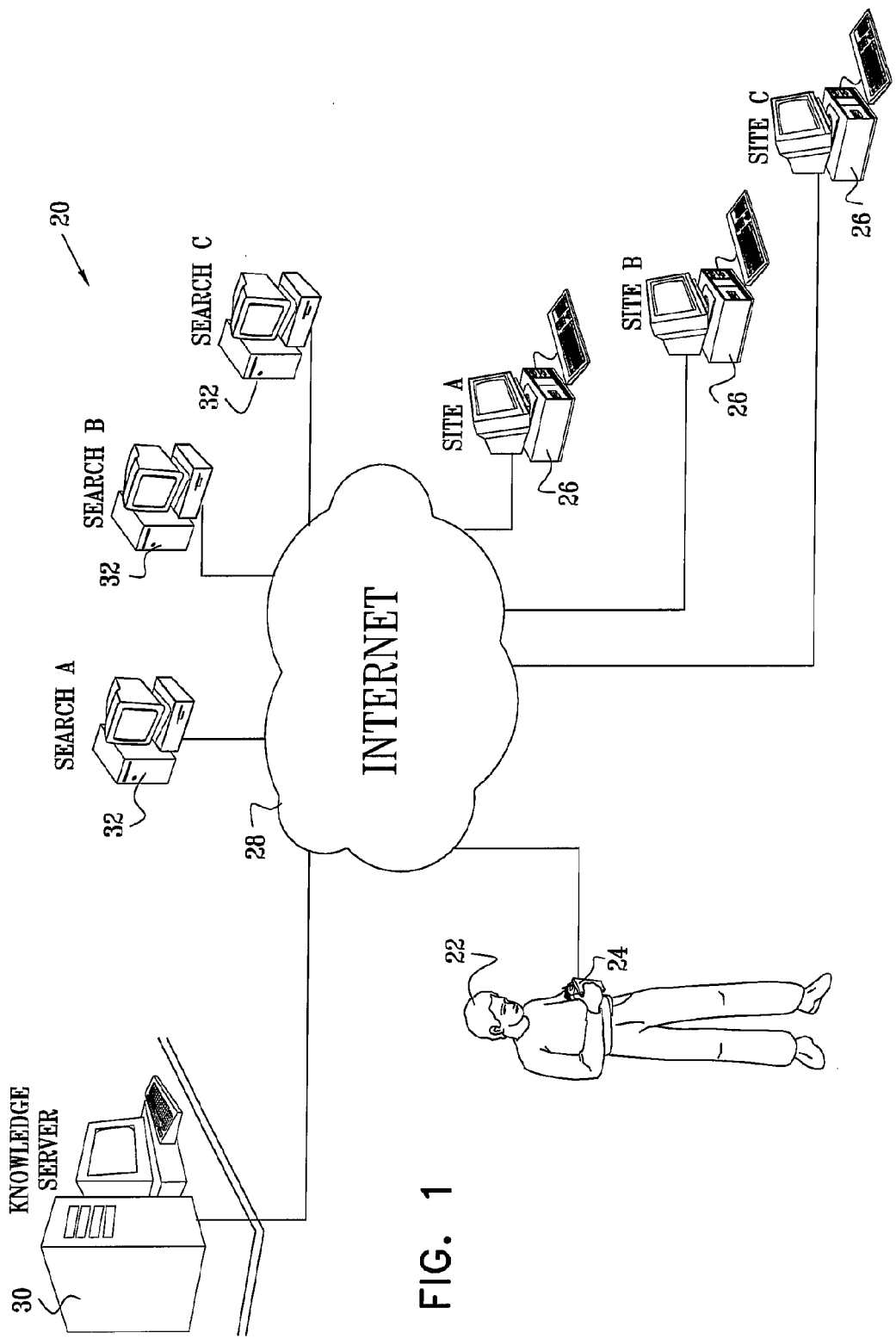
FIG. 1 is a schematic, pictorial illustration of a system for information search and retrieval, in accordance with a preferred embodiment of the present invention.

FIG. 1 is a schematic, pictorial illustration of a system 20 for information search and retrieval, in accordance with a preferred embodiment of the present invention. A user 22 uses a computing device 24 to connect to a network 28, typically the Internet, and to conduct a search among information repositories, such as Web sites 26. Device 24 is shown in the figure to be a pervasive device, such as a palm device or handheld computer. Alternatively, however, device 24 may comprise a desktop computer or other computer workstation.

The search is preferably conducted by means of a knowledge server 30. This server may comprise substantially any suitable general-purpose computer processor having a connection to network 28. It is referred to herein as a server because of its server-client relationship with device 24. Alternatively, the functions of device 24 and server 30 are combined, so that user 22 works directly on the "server" without a separate client device. Device 24 and server 30 carry out their functions, as described hereinbelow, by means of suitable software. This software may be conveyed to device 24 and server 30 in electronic form, over network 28, for example, or it may be supplied on tangible media, such as CD-ROM or non-volatile memory.

A knowledge agent program running on knowledge server 30 is responsible for carrying out the search for user 22. The knowledge agent typically interacts with multiple search engines 32 via network 28, directing the engines to search sites 26 for information relevant to a query entered by user 22. When the information gathering is complete, server 30 passes the information to device 24, typically either as an e-mail message or by download the next time user 22 connects to the server via the network.

Figure 2:
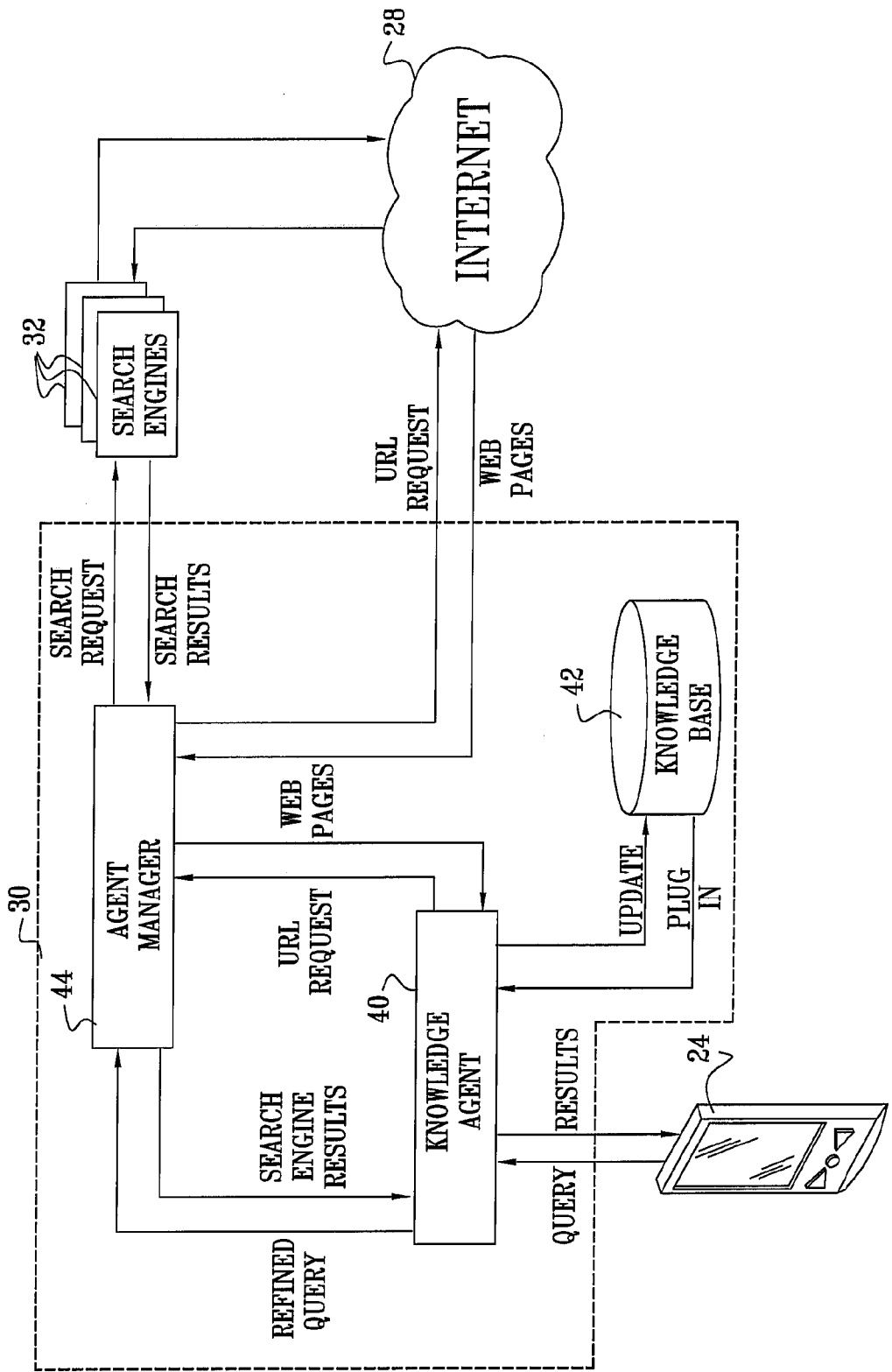
FIG. 2 is a block diagram showing functional details of the system of FIG. 1, in accordance with a preferred embodiment of the present invention.

FIG. 2 is a block diagram that schematically shows functional elements and interactions within server 30, in accordance with a preferred embodiment of the present invention. A knowledge agent 40 running on server 30 receives domain-specific queries from user 22, typically as input from device 24. The user preferably chooses one of a number of knowledge agents that are available on server 30 (or which are imported to the server from other sources), depending on the particular domain of the query. Additionally or alternatively, the user may identify sites 26 or Web pages on the sites that contain information relevant to the query, typically by inputting sample uniform resource locators (URLs) to agent 40.

An agent manager 44 sets up new knowledge agents and restarts existing agents when requested by the user. The manager is responsible for managing multiple concurrent connections for reading from network 28 and interacting with search engines 32 in service of any and all agents. Manager 44 receives queries from user 22 after the selected agent 40 has refined the user's query, as described below. Preferably, the agent manager performs a meta-search, by first invoking several general-purpose search engines specified by user 22, such as AltaVista, Google or Hotbot, for example, and then crawling from the pages returned by these engines to other, linked pages, as described hereinbelow. The agent manager returns the documents uncovered in the meta-search to agent 40 for ranking and filtering. Finally, the agent fetches and returns the best documents to device 24.

Each knowledge agent 40 has an associated knowledge base 42, which contains domain-specific information that the agent uses when searching. The knowledge base is preferably held in a memory unit, typically a storage device, such as a disk, associated with server 30. The information in the knowledge base preferably includes domain-specific vocabulary and legacy documents, most preferably identifying sites 26 that have been found relevant in past searches. The knowledge base is preferably initialized by providing a set of sites relevant to the domain of interest, for example, sites extracted from the user's bookmark file or from any other pre-defined categorization of Web sites. Subsequently, knowledge agent 40 operates in a search-and-learn mode. Whenever the agent performs a search in response to a user-specified query, the result is a list of candidate sites that the agent has collected, examined and ranked. The agent extracts knowledge from the search results, typically in the form of new, high ranking sites, which may enter the knowledge base while replacing existing sites that have become "stale." The process of renewing the contents of knowledge base 42 is described below in detail with reference to FIG. 6.

The domain-specific vocabulary held in knowledge base 42 is a repository of terms that appear in the high-ranking sites of the domain. Each term is preferably associated with a list of lexical affinities—other, closely-related terms that are frequently found in proximity to that term. Methods for finding lexical affinities in a corpus of documents are known in the art. Suitable methods for use in this context are described, for example, by Maarek and Smadja, in "Full Text Indexing Based on Lexical Relations, An Application: Software Libraries," published in *Proceedings of SIGIR*89 (N. Belkin and C. van Rijsbergen, eds., ACM Press, Cambridge, Mass.), pages 198-206, which is incorporated herein by reference. For example, for any given word in a sentence, all other words that are within the sentence and no more than five words away from the given word can be considered as its lexical affinities.

For each domain, knowledge base 42 preferably has the form of a file or set of files. Thus to import or export any knowledge agent from one server 30 to another, and/or from one user to another, it is sufficient to copy the appropriate knowledge base files. Thereafter, the user receiving the knowledge base can personalize the associated knowledge agent by carrying out further focused searches in his or her specific domain. As the user performs more and more such searches, the knowledge agent will become increasingly specialized in the particular domain of interest to the user.

Figure 3:
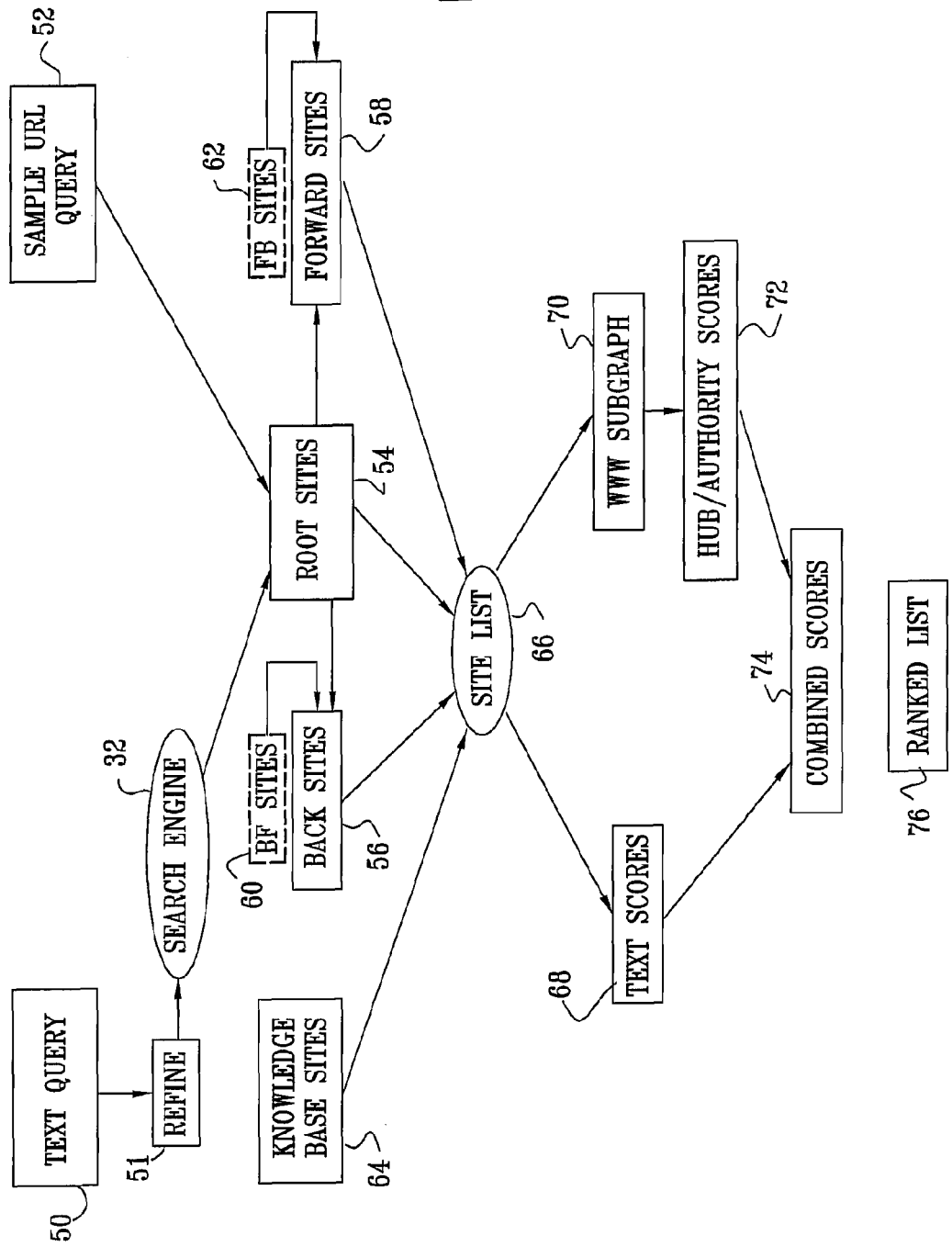
FIG. 3 is a flow chart that schematically illustrates a method for searching on the World Wide Web, in accordance with a preferred embodiment of the present invention.

FIG. 3 is a flow chart that schematically illustrates a method by means of which knowledge agent 40 carries out a search requested by user 22, in accordance with a preferred embodiment of the present invention. The agent supports two kinds of queries: text queries 50 and sample-URL queries 52. Text query 50 is a keyword-based query such as those typically submitted to general-purpose Web search engines. At a refinement step 51, the user's query is automatically refined in the context of the domain of agent 40 by adding to each of the keywords in the query its most notable lexical affinities, as found in the profile of knowledge base 42. Since these added keywords occur most frequently in the vicinity of the terms specified in query 50 within the context of the agent's domain, they improve the expressiveness of the query in several ways:

First, the added keywords may disambiguate an ambiguous user query by supplementing the query with the underlying context of the domain. For example, in a search for the query "knowledge," an "artificial intelligence" agent would likely expand the query to include the terms "acquisition," "reasoning," "discovery" and "representation," while a "cryptographic" agent would expand using the terms "zero," "private," etc.

Second, the added keywords can make the query more specific, thus aiding the search process in finding more precise results.

Finally, the added keywords may be synonyms of keywords in the original query within the domain of interest, so that relevant documents that would otherwise not be found (because they do not contain the original keywords), can be retrieved.

User 22 preferably sets a refinement factor, controlling the number of terms which the agent adds to each of the user's original input terms. The refinement factor is most preferably defined in terms of a threshold f, which the user sets to a value between zero and one. For each of the lexical affinities of each of the input terms, a frequency m is computed, based on the number of co-occurrences of the particular lexical affinity with the input term in the knowledge base. A maximal frequency M is given by the maximal value of m over all of the lexical affinities of the given term. The agent then adds to the user's query all of the lexical affinities having $m \geq f*M$. Additionally or alternatively, the user can edit the refined query before submitting it to the search process. The refined query is then submitted to the user's choice of one or more general-purpose search engines 32, and a user-specified number of results are collected from each of these engines. The results returned by the search engine(s) to the refined query are referred to herein as a root set 54 of sites 26.

Sample-URL query 52 is a query which specifies a few (typically one to five) seed URLs. Its purpose is to find a community of sites that are closely related to the seeds. Similar services are offered by the Excite search engine in its "More like this" feature, and by Google's "GoogleScout" feature. Whereas both of these services receive as input a single site, query 52 preferably allows the user to specify an arbitrary number of seeds. In sample-URL queries, the user-supplied seed sites assume the role of root set 54, as though they had been returned by a search engine in response to a textual query. Agent 40 reads the seed sites, and uses their combined content as a pseudo-query for the purpose of evaluating the textual content of other sites found subsequently in the search process, as described below (as though the user had originally entered the entire text of the seed sites as the query).

Root set 54 is expanded by shallow Web crawling over the hyperlinks surrounding the root sites to a set of backward sites 56 and forward sites 58. The preferred expansion model depends on the type of query which is being processed:

When processing text query 50, the expansion follows the scheme presented in the above-mentioned article by Kleinberg and adds two sets of sites:

1. Backward sites 56 (B), including sites which point to one or more root sites.

2. Forward sites 58 (F), including sites which are pointed to by one or more root sites.

When processing sample-URL query 52, the expansion phase is preferably more exhaustive and adds more sites, because the size of the root set (the number of user-supplied seed URLs) in such queries is typically much smaller than the size of the root set generated by text queries. Thus, without a broader expansion phase, the resulting graphs of linked Web sites will be too small and sparse for meaningful analysis. Agent 40 therefore adds the following sets of sites to the collection:

1. The previously mentioned sets, B and F.

2. Back-forward sites 60 (BF), including sites that point to one or more F-sites. Each of the BF sites thus shares an outgoing link with one of the seed sites.

3. Forward-back sites 62 (FB), including sites pointed to by one or more B-sites. Each of the FB sites thus shares an incoming link with one of the seed sites.

In both expansion schemes, the URL sets are not necessarily disjoint, and a Web site may belong to more than one set. The breadth of the expansion is preferably controlled by user 22, by specifying a link-expansion factor, L, for each query. This expansion factor, which is a natural number, specifies how many pointed/pointing sites will be added to the collection for each site in each expansion stage. Each link on a given page is preferably scored, as described below, based on the similarity of "anchor text" associated on the page with the link to the query terms. (The anchor text is the language that the pointing page uses to describe the destination page to Web surfers.) The L links with the highest scores are then selected.

A final site list 66 is assembled by adding a set of legacy sites 64, which are stored in knowledge base 42. These legacy sites are presumably central sites for the domain of interest. The entire collection of sites in list 66 is denoted as C.

Next, knowledge agent 40 traverses the retrieved pages in list 66 and ranks them such that the most relevant pages for the user will be listed first in the result. The ranking is performed by the agent, based on both textual and topological aspects, utilizing information stored in knowledge base 42. Textual similarity scores 68 are computed to measure the relevance of the pages retrieved both to the specific query and to the agent's specialized domain. To evaluate the topological aspects, a Web subgraph 70 is built embodying the links between the sites in list 66. The subgraph is used to compute hub/authority topology scores 72 for the sites in the list, as described below. Scores 68 and 72 are normalized and summed to give overall combined scores 74 for all of the pages. Finally, the search results, typically comprising the top few entries on a final list of sites 76, ranked in the order of their combined scores, are downloaded to device 24.

Figure 4:
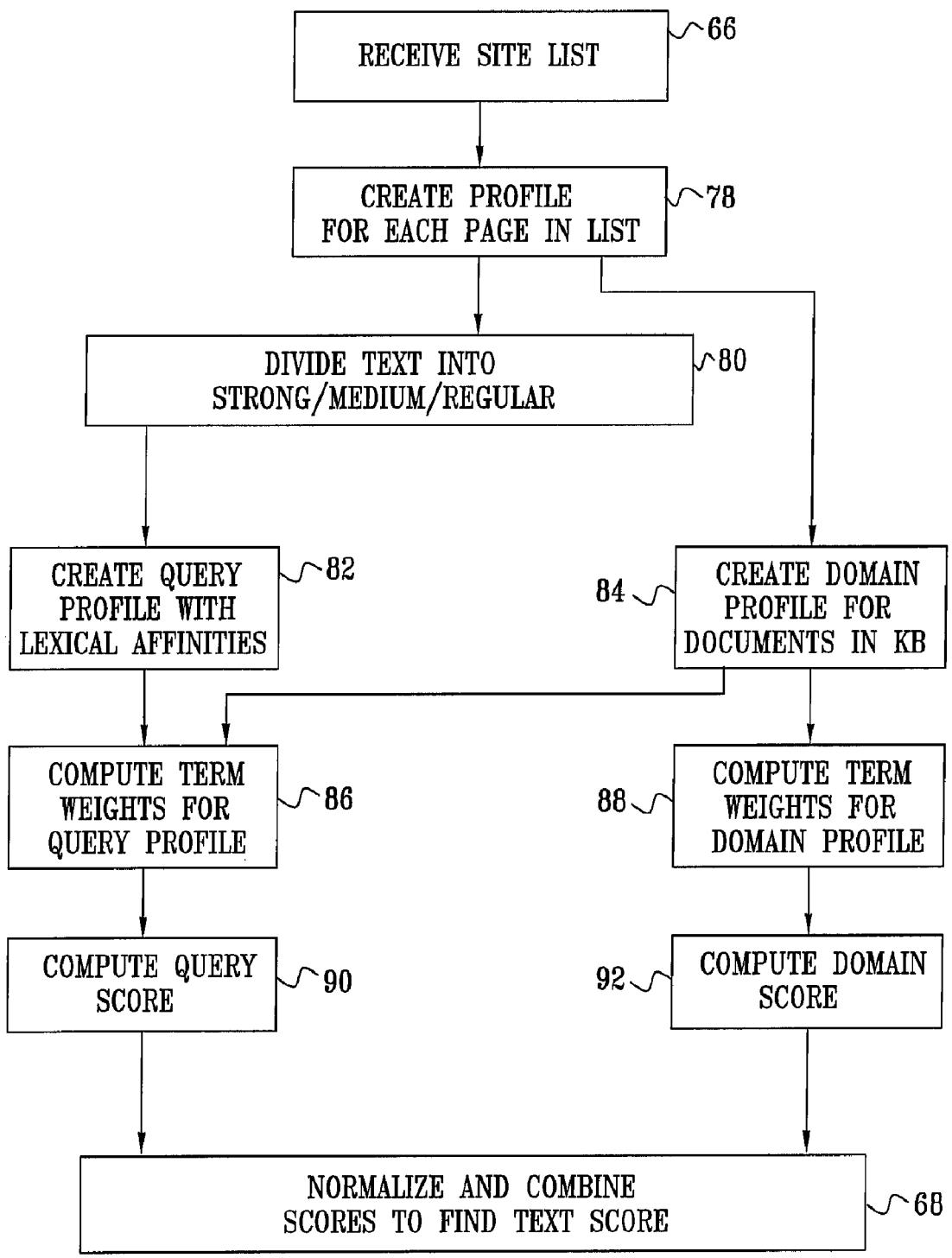
FIG. 4 is a flow chart that schematically illustrates a method for finding text scores, in accordance with a preferred embodiment of the present invention.

FIG. 4 is a flow chart that schematically illustrates a method for computing text scores 68, in accordance with a preferred embodiment of the present invention. Agent 40 processes site list 66 to generate a profile for each page, at a page profile creation step 78. The profile for each page includes all of the words in the page and their frequencies and lexical affinities (excluding common stop-words, which do not provide meaningful affinities). A stemming process is applied, to remove certain suffixes, for example. U.S. Pat. No. 4,342,055, whose disclosure is incorporated herein by reference, describes an exemplary method of stemming that may be used in this context. The words in each page profile are divided into three groups, at a grouping step 80: strong, medium and regular. Strong text includes the words that appear in the title or in large font headers; medium text includes words that are either highlighted (bold, italics, etc.) or in small font headers; and all the rest is regular text.

For both query types 50 and 52, there is some text that defines the search topic: either the small, possibly refined, user-provided text query, or a larger pseudo-query derived from the contents of the set of user-supplied seed sites. At a query profile creation step 82, agent 40 creates a profile consisting of each word in the text query (not including stop-words), along with its lexical affinities, and indicating the number of times each word appears in the query.

A domain profile is similarly created from the documents in knowledge base sites 64, at a domain profile creation step 84. Although for convenience of presentation, step 84 is shown in FIG. 4 as occurring in the course of the search process, in actuality this step is preferably performed in advance, and the domain profile is stored and updated as part of knowledge base 42. The domain profile contains all of the words that appear in the knowledge base sites (after deletion of stop-words and stemming), along with the number of times that they appear and their lexical affinities. The domain and its profile are preferably maintained as part of knowledge base 42 and are updated by knowledge agent 40 after each search, most preferably as described below with reference to FIG. 6. The domain profile serves as a base against which agent 40 scores the frequency of occurrence of the terms in the page profiles, using the computations below. For the purpose of these computations, TC denotes the total term count in the domain profile (including both words occurring in the domain documents and their lexical affinities), and kb(t) is the number of times a given term t occurs in the domain profile.

At a query weight computation step 86, a weight $W_q(t)$ is computed as follows for each term t that occurs in the text query:

$$W_q(t) = q(t) \cdot \log\left(\frac{TC}{\max(1, kb(t))}\right) \quad (1)$$

Here q(t) is the number of times the term t appears in the query q. A similar domain weight $W_d(t)$ is set for each term t occurring in the profile of the documents in knowledge base 42 to be equal to log [kb(t)], at a domain weight computation step 88.

Based on the weights $W_q(t)$ and $W_d(t)$, a query textual score $T_q(s)$ and a domain textual score $T_d(s)$ are computed at a query scoring step 90, and at a domain scoring step 92, respectively. The query textual score $T_q(s)$ of site s is defined as a weighted average of the term weights for each of the strong, medium and regular term types in the site:

$$T_q(s) = W_s \cdot \frac{\sum_{i=1}^{TC_s} W_q(t_s^i)}{3\sqrt{TC_s}} + W_m \cdot \frac{\sum_{i=1}^{TC_m} W_q(t_m^i)}{3\sqrt{TC_m}} + W_r \cdot \frac{\sum_{i=1}^{TC_r} W_q(t_r^i)}{3\sqrt{TC_r}} \quad (2)$$

Here $TC_s$, $TC_m$ and $TC_r$ denote the number of terms in the strong, medium, and regular text types, respectively. $W_s$, $W_m$ are $W_r$ are constant weights, preferably set to 3.0, 2.0 and 1.0, respectively, which are assigned to each type of text so as to determine the influence of that text type in the total score. $W_q(t_x^i)$ are the term weights computed by equation (1) above for terms that appear in the query profile against which site s is being evaluated. The weights are set to zero for terms that appear in s but do not appear in the query or domain profile. The weights of all of the query terms or domain terms that appear in the Web page under consideration are thus summed over their occurrences in each of the strong, medium and regular types, and normalized by the total number of terms of that type in the page.

The domain score is determined at step 92 as a dot product of the vector of lexical affinities of s with the domain profile, given by:

$$T_d(s) = \frac{\sum_{i=1}^{TC} W_d(t^i)}{\sqrt{TC}} \quad (3)$$

Finally, $T_q(s)$ and $T_d(s)$ are normalized and combined to create the overall textual similarity score 68 for each site, $T_{total}(s)$:

$$T_{total}(s) = w_q \cdot T_q(s) + w_d \cdot T_d(s) \quad (4)$$

Here the weights, $w_q$ and $w_d$, depend on the relative weights given to query similarity as against domain similarity, wherein $w_q + w_d = 1$.

Figure 5:
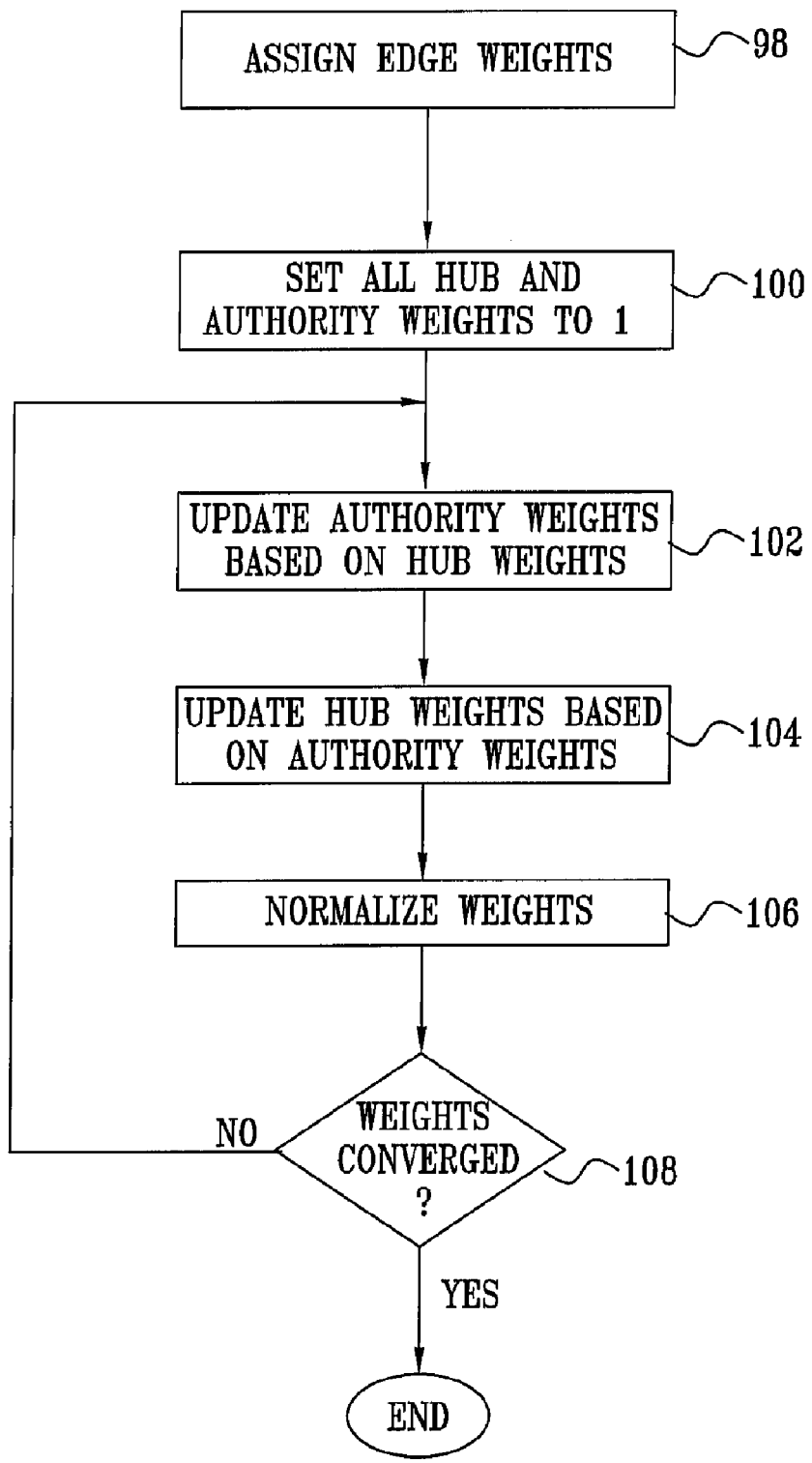
FIG. 5 is a flow chart that schematically illustrates a method for finding hub and authority scores, in accordance with a preferred embodiment of the present invention.

FIG. 5 is a flow chart that schematically illustrates a method for computing hub and authority scores 72, in accordance with a preferred embodiment of the present invention. The method uses connectivity analysis of Web subgraph 70 of site collection C, built during the search process, in order to find authoritative Web sites. The idea behind connectivity analysis is that a hyperlink from a site s to a site t indicates that these two sites share a common topic of interest, and that s conveys a positive assessment of the content of t by virtue of recommending that surfers who visit s also visit t. Such links are referred to as informative links.

In order to compute the link topology score, agent 40 first assigns weights to the edges of Web subgraph 70, at a weight assignment step 98. Preferably, every link receives a positive weight, which is set according to the anchor text associated with the link and the "type" of the sites on both sides of the link (i.e., whether or not the source site and the target site of the directed hyperlink belong to domain sites 64 in knowledge base 42):

Anchor Text contribution: the anchor text, as mentioned above, is the language that the pointing page uses to describe the destination page to surfers. It is often a good source of information regarding the contents of the destination site. Therefore, the anchor text is preferably evaluated to assess its resemblance to the query, using a formula similar to equation (2), without the division of text into different types, to find an anchor score. The weight of the link that the anchor text describes is modified depending on the anchor score, preferably by normalizing the anchor score (most preferably to a value between 0 and 1.25) and then multiplying the weight by the normalized score.

Anchor Links: links that connect one of knowledge base sites 64 with a non-knowledge base site (in either direction) are considered to be important, since they connect a site which is presumed to be central to the domain (the knowledge base site) with a site that presumably answers the specific query. Such cross-links are called anchor links, and their weight is increased by a constant additive, preferably by 0.5.

The Web subgraph with weighted edges is used to assign hub and authority scores to each site. Preferably, each site s in C receives a hub score h(s) and an authority score a(s) from which a cumulative link topology score $L_{total}(s)$ is derived. The hub and authority scores are preferably based on applying Kleinberg's Mutual Reinforcement algorithm. Alternatively, Lempel and Moran's SALSA algorithm could also be used. Publications describing both of these algorithms are cited in the Background of the Invention.

To compute the Mutual Reinforcement scores, all of the sites in subgraph 70 are given initial hub and authority weights equal to one, at an initialization step 100. The authority weights of all of the sites are then recomputed, at an authority updating step 102, by setting the new authority weight for each of the sites equal to a weighted sum of the hub weights of all of the other sites that point to it, wherein the hub weights are weighted by the corresponding link weights assigned at step 98. These new authority weights are used to recompute the hub weights, at a hub updating step 104, by setting the new hub weight for each of the sites equal to the weighted sum of the authority weights of all of the other sites to which it points. The new hub and authority weights are normalized, at a normalization step 106, and the process is repeated until the weights have converged, at a convergence step 108. The total link topology score is then given by:

$$L_{total}(s) = w_a \cdot a(s) + w_h \cdot h(s) \quad (5)$$

wherein the weight factors $w_a$ and $w_h$ are preferably set to 0.75 and 0.25, respectively.

Finally, agent 40 computes the overall, combined scores 74 S(s) for all of the Web pages in site list 66:

$$S(s) = a_c \cdot L_{total}(s) + (1 - a_c) \cdot T_{total}(s) \quad (6)$$

The link topology $L_{total}$ scores are reliable only for collections of sites C in which many neighboring sites have been added around root sites 54. Therefore, agent 40 preferably sets the value of $a_c$ according to the ratio between the size of compiled collection 66 relative to the size of root set 54. The larger the ratio, the more confidence there is in the link-based score, and the higher $a_c$ is set. When the ratio is low, meaning that the link-expansion phase did not add many sites 56, 58, 60 and 62, the influence given to the text-based scores is increased, by lowering $a_c$. Preferably, $a_c$ is set to 0.05 times the ratio of the size of the compiled collection to the size of the root set, or to 0.9, whichever is larger.

Figure 6:
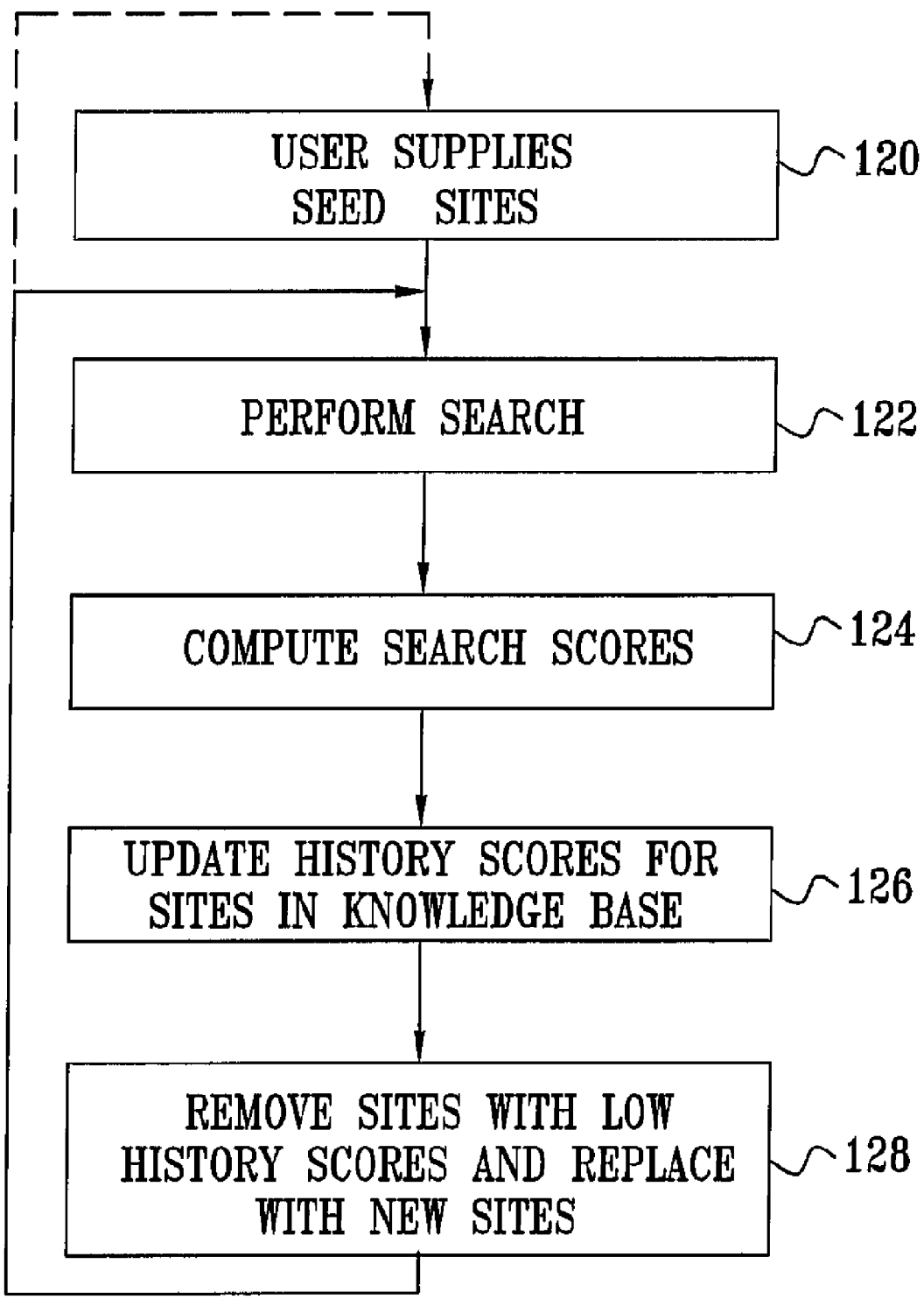
FIG. 6 is a flow chart that schematically illustrates a method for creating and updating a knowledge base, in accordance with a preferred embodiment of the present invention.

FIG. 6 is a flow chart that schematically illustrates a method for creating and updating knowledge base 42, in accordance with a preferred embodiment of the present invention. As noted above, the knowledge base contains a bounded collection of ranked sites and an aggregate profile of the textual content of these sites. Sites saved in the knowledge base are those that have proven to be highly relevant to many of the queries that user 22 has submitted to knowledge agent 40. The rationale for this approach is that sites that are consistently found to be relevant to the user's queries are assumed to be central to the domain in question.

In order to enforce the bound on the number of sites in the knowledge base, knowledge agent 40 preferably implements an evolutionary adaptation mechanism. Each site kept in the knowledge base is assigned a history score, which reflects the site's relevance to the domain through the course of the use of the agent. The history scores are compared to the combined relevance scores 74 found for a specific query in order to determine which new sites are inserted into the knowledge base and which old sites are removed from it.

As noted above, user 22 preferably supplies a set of seed sites when a new knowledge base is created, at a seeding step 120. In addition, the user may return to step 120 and add relevant sites to an existing knowledge base at any point. If the knowledge base contains the maximal number of sites that it is allowed, the site with the lowest history score becomes stale and is removed from the knowledge base, in order to make room for the new, user-specified site. Sites that are entered into the knowledge base explicitly by the user preferably receive a high initial history score, since the user's judgment of the quality of these sites is assumed to be valid.

Knowledge agent 40 automatically updates the history scores and refreshes the contents of the knowledge base after performing a search, at a search step 122, and computing the cumulative search scores S(s), at a scoring step 124. Upon completion of the t-th search process, the t-generation history score $h_t(s)$ of each site s in knowledge base 42, is updated, at a history update step 126, according to the formula:

$$h_t(s) \leftarrow (1 - \beta_t) \cdot h_{t-1}(s) + \beta_t \cdot S(s) \quad (4)$$

Here $h_{t-1}(s)$ was the history score of s prior to the t-th search. $\beta_t$ is a learning coefficient, which controls the adaptation rate of the knowledge base and thus balances the prior history score of site s against its current specific score. The relative importance of the two scores changes with the age of agent 40, so that as the number of queries performed by the agent grows, the weight of the history is preferably increased. In other words, "mature" agents, which have survived many queries, are considered more likely to be highly relevant to the domain in question. Preferably, therefore, $\beta_t = \beta_0 \cdot \delta^t$, wherein $\beta_0$ is an initial coefficient value, and $\delta < 1$ is a decay factor. Most preferably, $\beta_0 = 0.15$, and $\delta = 0.99$, and the decay of $\beta_t$ is halted when it drops to a value of 0.05.

At a site removal step 128, the new history scores of the sites in knowledge base 42 are compared to the overall scores S(s) of the new sites returned by the search. New sites with high overall scores preferably replace old sites with low history scores in the knowledge base. The initial history scores of any such new sites are set to their current overall scores. Old, "stale" sites are thus pruned out of the knowledge base, while new and useful sites are added.

While preferred embodiments of the present invention are described particularly with reference to searching for information on the World Wide Web, those skilled in the art will understand that the methods and principles of the present invention may similarly be applied, mutatis mutandis, in other information retrieval contexts. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for searching a corpus of documents, comprising:
    defining a knowledge domain;
    identifying a set of reference documents in the corpus pertinent to the domain;
    inputting a first query;
    searching the corpus using the set of reference documents to find one or more of the documents in the corpus that contain information in the domain relevant to the first query; and
    adding at least one of the found documents to the set of reference documents for use in searching the corpus for information in the domain relevant to a second, subsequent query, which is substantially different from the first query,
    wherein searching the corpus comprises searching the corpus to find the documents that contain the information relevant to the query and ranking the found documents by comparing them to the set of reference documents, and
    wherein ranking the found documents comprises assessing links between the found documents and the reference documents.

2. The method according to claim 1, wherein inputting the first query comprises inputting one or more search terms.

3. The method according to claim 2, wherein searching the corpus comprises finding lexical characteristics of terms in the reference documents and refining the search terms using the lexical characteristics.

4. The method according to claim 1, wherein inputting the first query comprises specifying one or more documents representative of the information to be found in the corpus.

5. The method according to claim 1, wherein ranking the found documents comprises evaluating a textual resemblance between the found documents and the reference documents.

6. The method according to claim 1, wherein adding the at least one of the found documents comprises adding at least the document having the highest ranking.

7. The method according to claim 1, wherein adding the at least one of the found documents comprises removing one of the documents from the set responsive to adding the at least one of the found documents.

8. The method according to claim 7, and comprising tracking a level of relevance of the reference documents to the queries, and wherein removing the one of the documents comprises removing one of the reference documents whose tracked level of relevance is low.

9. The method according to claim 1, wherein the corpus comprises at least a part of the World Wide Web, and the documents comprise Web pages, and wherein searching the corpus comprises conveying the query to one or more Web search engines.

10. The method according to claim 9, wherein inputting the first query comprises receiving the query from a user of a pervasive device, and wherein searching the corpus comprises searching while the device is disconnected from the Web.

11. The method according to claim 1, wherein identifying the set of reference documents comprises opening one or more files of a knowledge base on a computer in which data regarding the reference documents are saved.

12. The method according to claim 11, wherein identifying the set of reference documents comprises identifying the set of documents used by a first user in searching the corpus, and wherein opening the one or more files comprises copying the files for use by a second user in searching the corpus for information in the domain.

13. Apparatus for searching a corpus of documents, comprising:
    a memory, adapted to store an identification of a set of reference documents in the corpus pertinent to a predefined knowledge domain; and
    a search processor, which responsive to receiving a first query as input, is adapted to search the corpus using the set of reference documents to find one or more of the documents in the corpus that contain information in the domain relevant to the first query, and to add at least one of the found documents to the set of reference documents stored in the memory for use in searching the corpus for information in the domain relevant to a second, subsequent query, which is substantially different from the first query,
    wherein the processor is adapted to receive the documents found to contain the information relevant to the query and to rank the found documents by assessing links between the found documents and the reference documents.

14. The apparatus according to claim 13, wherein the processor is adapted to find lexical characteristics of the terms in the reference documents and to refine the search query using the lexical characteristics.

15. The apparatus according to claim 13, wherein the processor is adapted to add to the corpus at least the document having the highest ranking.

16. The apparatus according to claim 13, wherein the processor is adapted to remove one of the documents from the set responsive to adding the at least one of the found documents.

17. The apparatus according to claim 13, wherein the corpus comprises at least a part of the World Wide Web, and the documents comprise Web pages, and wherein the processor is adapted to search the corpus by conveying the query to one or more Web search engines.

18. The apparatus according to claim 13, wherein the processor is adapted to receive the query over a communication link from a user of a pervasive device, and to search the corpus while the communication link is disconnected.

19. A computer software product for searching a corpus of documents, the product comprising:
a computer-readable medium in which program instructions are stored, which instructions, when read by a computer, cause the computer to receive a definition of a knowledge domain and an identification of a set of reference documents in the corpus pertinent to the domain, and further cause the computer, responsive to a first query, to search the corpus using the set of reference documents to find one or more of the documents in the corpus that contain information in the domain relevant to the first query, and to add at least one of the found documents to the set of reference documents for use in searching the corpus for information in the domain relevant to a second, subsequent query, which is substantially different from the first query,
wherein the instructions cause the computer to receive the documents found to contain the information relevant to the query and to rank the found documents by assessing links between the found documents and the reference documents.

20. The product according to claim 19, wherein the corpus comprises the World Wide Web, and the documents comprise Web pages, and wherein the instructions cause the computer to search the Web by conveying the query to one or more Web search engines.

21. The product according to claim 20, wherein the instructions cause the computer to receive the first query from a pervasive device, and to search the Web while the pervasive device is disconnected from the Web.

* * * * *